United States Patent
Vaandering

(10) Patent No.: US 11,065,730 B2
(45) Date of Patent: Jul. 20, 2021

(54) WORK PIECE MOUNTING SYSTEM

(71) Applicant: Rian Solutions Inc., Brantford (CA)

(72) Inventor: Henry Vaandering, Brantford (CA)

(*) Notice: Subject to any disclaimer, the term of this patent is extended or adjusted under 35 U.S.C. 154(b) by 270 days.

(21) Appl. No.: 16/426,217

(22) Filed: May 30, 2019

(65) Prior Publication Data
US 2019/0375062 A1   Dec. 12, 2019

Related U.S. Application Data

(63) Continuation of application No. 62/682,213, filed on Jun. 8, 2018.

(51) Int. Cl.
*B23Q 3/06*   (2006.01)
*B23Q 3/08*   (2006.01)

(52) U.S. Cl.
CPC .............. *B23Q 3/062* (2013.01); *B23Q 3/069* (2013.01); *B23Q 3/08* (2013.01)

(58) Field of Classification Search
CPC . B23Q 3/02; B23Q 3/06; B23Q 3/062; B23Q 3/069; B23Q 3/08; B23Q 3/102; B23Q 3/107; B23Q 3/108; B23Q 3/14; B25H 1/08; B25H 1/10
See application file for complete search history.

(56) References Cited

U.S. PATENT DOCUMENTS

| | | | | |
|---|---|---|---|---|
| 1,256,706 A | * | 2/1918 | Lewis | F16B 5/0208 411/105 |
| 2,639,179 A | * | 5/1953 | Phelps | E05B 65/0057 292/251 |
| 5,415,384 A | * | 5/1995 | Obrist | B23Q 1/0072 269/309 |

* cited by examiner

*Primary Examiner* — Tyrone V Hall, Jr.

(57) ABSTRACT

The present concept a work piece mounting system for connecting two work elements together, includes a main body with radially oriented horizontal upper and lower jaw passageways for receiving therein upper and lower jaws respectively. The radially oriented horizontal upper and lower jaw passageways, are adapted to receive the jaws slid-ably therein, wherein the cross section of the jaws and passageways configured such that the jaws are restricted from rotating within the passageways. A vertical cavity extending vertically and centrally through the main body, along a z-axis, is for receiving a grooved end of a lower fixation element upwardly therein and a grooved end of an upper fixation element downwardly therein, wherein the other threaded end of the fixation elements are configured for detachably connecting to a working element. Wherein the jaws include a grooved portion for engaging with a grooved end of the fixation elements and are configured such that the fixation elements are drawn into the main body upon engagement of the grooved portions with the grooved ends thereby tensioning the fixation elements between the main body and a work elements. Further the angular relationship between the upper jaw passageway and the lower jaw passageway in a horizontal plane x-y relationship is selected to be able to nest the passageways to minimize a thickness T of the main body for improved rigity and dimensional stability of the work piece mounting system.

9 Claims, 5 Drawing Sheets

WORK PIECE MOUNTING SYSTEM

The application claims priority from U.S. provisional application No. 62/682,213 filed on Jun. 8, 2018 under the title; Work Piece Mounting System by inventor Henry Vaandenng and applicant Rian Solutions Inc.

FIELD OF THE INVENTION

The present invention relates to a work piece mounting systems and in particularly relates to a system for mounting a work piece onto a plate or work table.

BACKGROUND OF THE INVENTION

Machine shops and or machine facilities which produce small production runs or mostly one off custom parts require an extremely flexible method for mounting the work piece onto a plate or a worktable. These mounting methods are sometimes referred to as fixturing. The work piece which is the part to be machined is positioned and fixed onto a plate or worktable. The work-piece is normally connected and is positioned and fixed on the machine manually.

This is unlike mass production environments where the work piece or the part to be machined is automatically put in place using various robotic or other fixturing devices.

In the case of a machine shop or a job shop which produces many one off customized parts the work piece or the piece to be machined comes in various sizes and shapes and therefore one has to have the flexibility and the ability to be able to mount a variety of shapes of work pieces on to a plate or the work table of the machine so as to fix it as rigidly as possible in position.

DISCUSSION OF PRIOR ART

There are a number of work piece mounting systems that have been patented in the past, including the system described in European Patent EP1346794 filed Feb. 27, 2003 having applicant and inventor, Almerino Canuto, under the title MODULAR STRUCTURE PARTICULARLY FOR MOUNTING BLANKS ON RETAINERS.

This system has been received with some success in the marketplace, however, there are certain disadvantages to this system including the following.

Firstly, the height of the main body referenced as numeral 8 in FIG. 1 of the prior art is quite high resulting in a less than optimal rigidity. The higher the work piece is mounted from the work table or plate the lower the rigidity of the fixture and ultimately the part being machined. This is often referred to as the standoff. Fixturing must minimize standoff distances to maximize rigidity and which ultimately leads to the production of higher tolerance parts. When machining precision components rigidity is critical in being able to hold very tight tolerances.

Secondly, the radial holes which are denoted by third radial hole 12 in the prior art patent FIGS. 1 and 2 are circular and allow the locking cylindrical jaws, namely first jaws 13A and 13B, to freely rotate within the radial hole 12. Firstly this makes it difficult to align the head 9a of the traction elements 9 with the two portions of the jaws 13A and 13B since their orientation is not fixed. This causes increased set up times and lower productivity.

Secondly since Jaws 13A and 13B of the prior art are free to rotate damage to the teeth is prevalent due to misalignment issues and freedom of movement.

Thirdly set screws referred to as pins 27A in the prior are tend to break and fail due to the ability of the jaws 13A and 13B to move freely within radial or circular hole 22.

Fourthly the wear and breakage of the teeth 20A of jaws 13A and 13B, the wear and breakage of set screws 27A can lead to premature failures which may result in safety concerns.

Additionally clamping the jaws 13A and 13B in parallel directions through the main body results in unbalanced stresses, reduced rigity and dimensional stability.

There is a need for a fixturing system which optimizes rigidity and minimizes set up times, which reduces part wear and tear and provides a safer work environment for machining operations that utilize this type of fixturing described in prior art document EP1346794 for the reasons stated above. Other benefits and advantages to the presently described mounting system will become apparent to the reader.

SUMMARY

The present concept a work piece mounting system which includes a main body with radially oriented horizontal upper and lower jaw passageways for receiving therein upper and lower jaws respectively. The radially oriented horizontal upper and lower jaw passageways, are adapted to receive the jaws slidably therein, wherein the cross section of the jaws and passageways configured such that the jaws are restricted from rotating within the passageways. A vertical cavity extending vertically and centrally through the main body, along a z-axis, and is for receiving a grooved end of a lower fixation element upwardly therein and a grooved end of an upper fixation element downwardly therein, wherein the other threaded end of the fixation elements are configured for detachably connecting to a working element. Wherein the jaws include a grooved portion for engaging with a grooved end of the fixation elements and are configured such that the fixation elements are drawn into the main body upon engagement of the grooved portions with the grooved ends thereby tensioning the fixation elements between the main body and work elements. The work element may be a work piece 106 or a plate 102.

The present concept is a work piece mounting system which includes:
a. a main body with horizontal upper and lower jaw passageways for receiving therein upper and lower jaws;
b. a vertical cavity defined centrally and extending vertically through the main body for receiving a grooved end of a lower fixation element and a grooved end of an upper fixation element therein wherein the other end of the fixation elements may be detachably connected to a plate or a workpiece;
c. radially oriented horizontal upper and lower jaw passageways, for receiving jaws slidably therein wherein the cross section of the jaws and passageways configured such that the jaws cannot rotate within the passageway;
d. wherein the jaws include a grooved portion for engaging with a grooved end of the fixation elements such that the fixation elements are drawn into the main body upon engagement of the grooved portions with the grooved ends thereby tensioning the fixation elements between the main body and the plate or workpiece;
e. wherein upper jaw passageway when viewed from the top of main body extends perpendicular to lower jaw passageway and are nested in such a fashion that the thickness T of the main body is minimized.

The present concept a work piece mounting system may also include:
a. a plate with at least one lower seat;
b. a work piece with at least one upper seat;
c. positioned there between a main body with an upper and lower detachable fixation element adapted to detachably connect the main body to the work piece and plate respectively;
d. jaws received within upper and lower passageways for clamping against the fixation elements, the fixation elements are drawn into the main body upon clamping thereby tensioning the fixation elements between the main body and the plate or workpiece;
e. wherein the upper sand lower passageways are oriented orthogonal to each other in the x-y plane and are nested in such a fashion that the thickness T of the main body is minimized.
f. Further wherein the passageways and jaws are configured to prevent rotation of the jaws.

BRIEF DESCRIPTION OF THE DRAWINGS

The present concept will now be described by way of example only with reference to the following drawings in which;

FIG. 2 is an exploded assembly view of the work piece mounting system shown in FIG. 1 rotated 90° such that the first and second upper jaw passage ways are move visible to the reader.

DETAILED DESCRIPTION OF THE PREFERRED EMBODIMENTS

Figure 1:
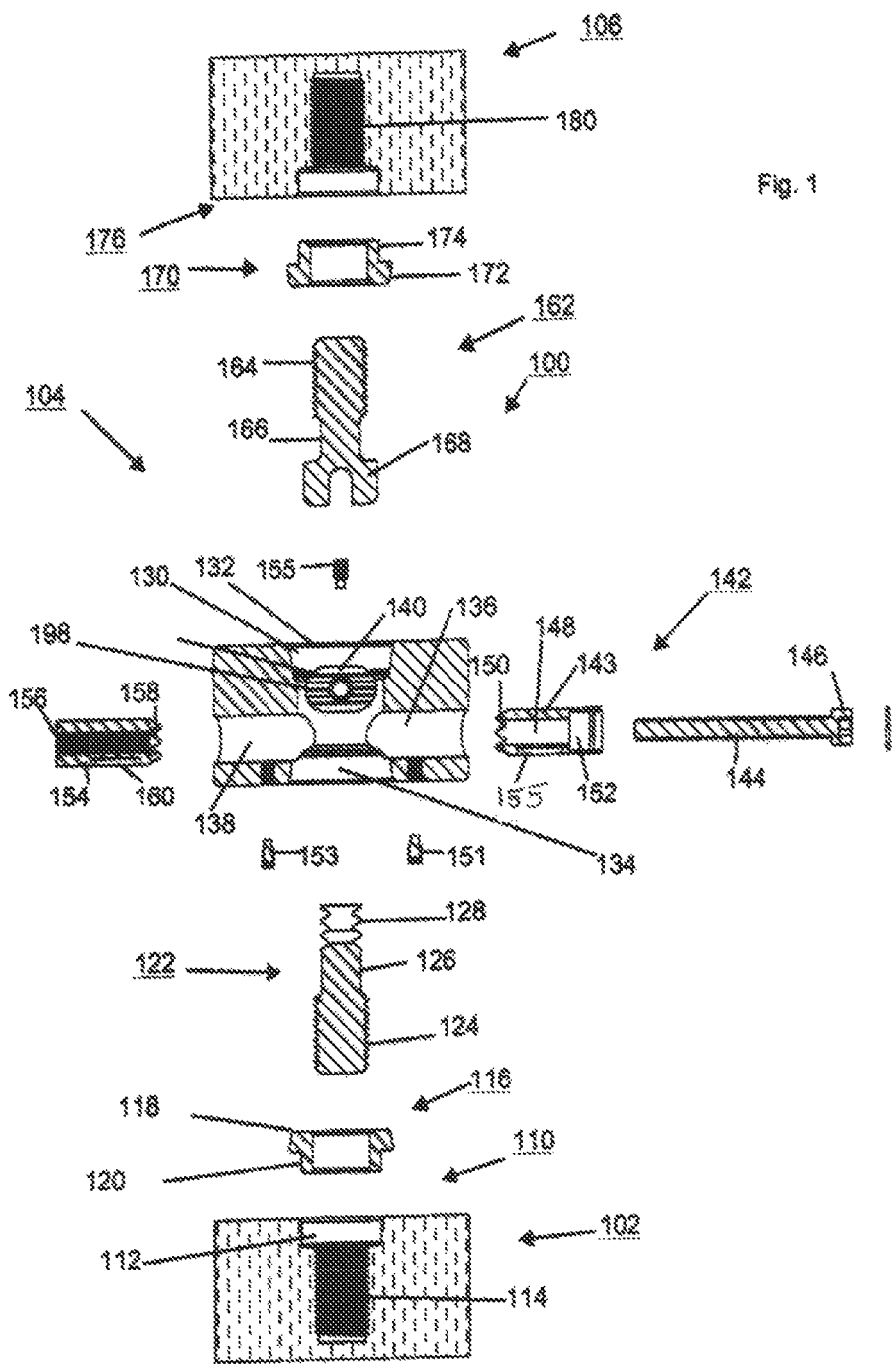
FIG. 1 is an exploded assembly view of a work piece mounting system shown generally 100 together with a portion of a plate 102 also referred to as a work table and a portion of a work piece 106.

The present concept shown schematically in the figures is a WORK PIECE MOUNTING SYSTEM shown generally as 100 and interacts or attaches to a portion of a plate 102 or work table 102. Note; the words plate and work table are used interchangeably within this specification for the following reason. Plate 102 may in fact be a further work piece which ultimately is attached to a work table or the structure shown as plate 102 could actually be the structure that is part of a work table 102. In other words, a work table could be integrally part of a machine tool such as a vertical boring mill or horizontal lathe whereas plate 102 may in fact be a separate piece which is then fixed to the work table. Plate 102 may be an intermediate piece which ultimately connects to the work table the structure shown as plate 102 maybe the structure that is defined within the work table itself thereby eliminating the need for an intermediary plate.

The present concept a WORK PIECE MOUNTING SYSTEM shown generally as 100 therefore includes the following major components, namely, plate or work table 102, collar 116, lower fixation element 122, main body 104, first lower jaw assemblies 142 and second lower jaw 154 respectively, upper fixation element 162, upper centering collar 170.

The WORK PIECE MOUNTING SYSTEM is designed to connect two work elements together. The WORK PIECE MOUNTING SYSTEM connects to a work element which may be a work piece such as a portion of work piece 106 depicted in the drawings. The work piece could take on almost any shape. The work element may also be a work table such as a portion of work table 102 depicted. The most common use of the WORK PIECE MOUNTING SYSTEM is to connect a work piece to a work table wherein the work table is part of a machining centre, Starting from the bottom ie plate 102 and working our way to the top ie work piece 106 I will now describe in more detail the WORK PIECE MOUNTING SYSTEM 100.

Plate or work table 102 would include a lower seat 110, which includes a bushing receiver 112 and lower blind threaded hole 114 for receiving lower threaded end 124 of lower fixation element 122 thread-ably therein.

Lower centering collar 116 includes a shoulder 118 which protrudes from the top surface of plate/work table 102 and a bushing portion 120 which is slid-ably received within bushing receiver 112 of lower seat 110.

Shoulder 118 is a conical frustum shaped outer parametric surface which cooperatively fits into lower shoulder recess 134 of main body 104.

Lower fixation element 122 includes Sower threaded end 124, shank portion 126 and grooved end 128. The grooved ends 128 and 168 are U shaped in a tuning fork configuration to provide clearance for the tightening screws namely upper and lower screw 190, 144.

Main body 104 includes a vertical cavity 130 which has a lower shoulder recess 134 with an interior taper for receiving the outer tapered portion of shoulder 118 of lower centering collar 116 therein and an upper shoulder recess 132 with an interior taper for receiving the outer tapered portion of shoulder 172 of upper centering collar 170 therein. The tapered portion of shoulder 172 defines a frustrum shaped outer parametric surface which also is also called or denoted a tapered conical surface which cooperatively mates with the upper shoulder recess 132. The same is for shoulder 118. Vertical cavity 130 also is adapted to receive grooved end 128 of lower fixation element 122 therein as well as simultaneously receiving grooved end 168 of upper fixation element 162 therein.

Figure 3:
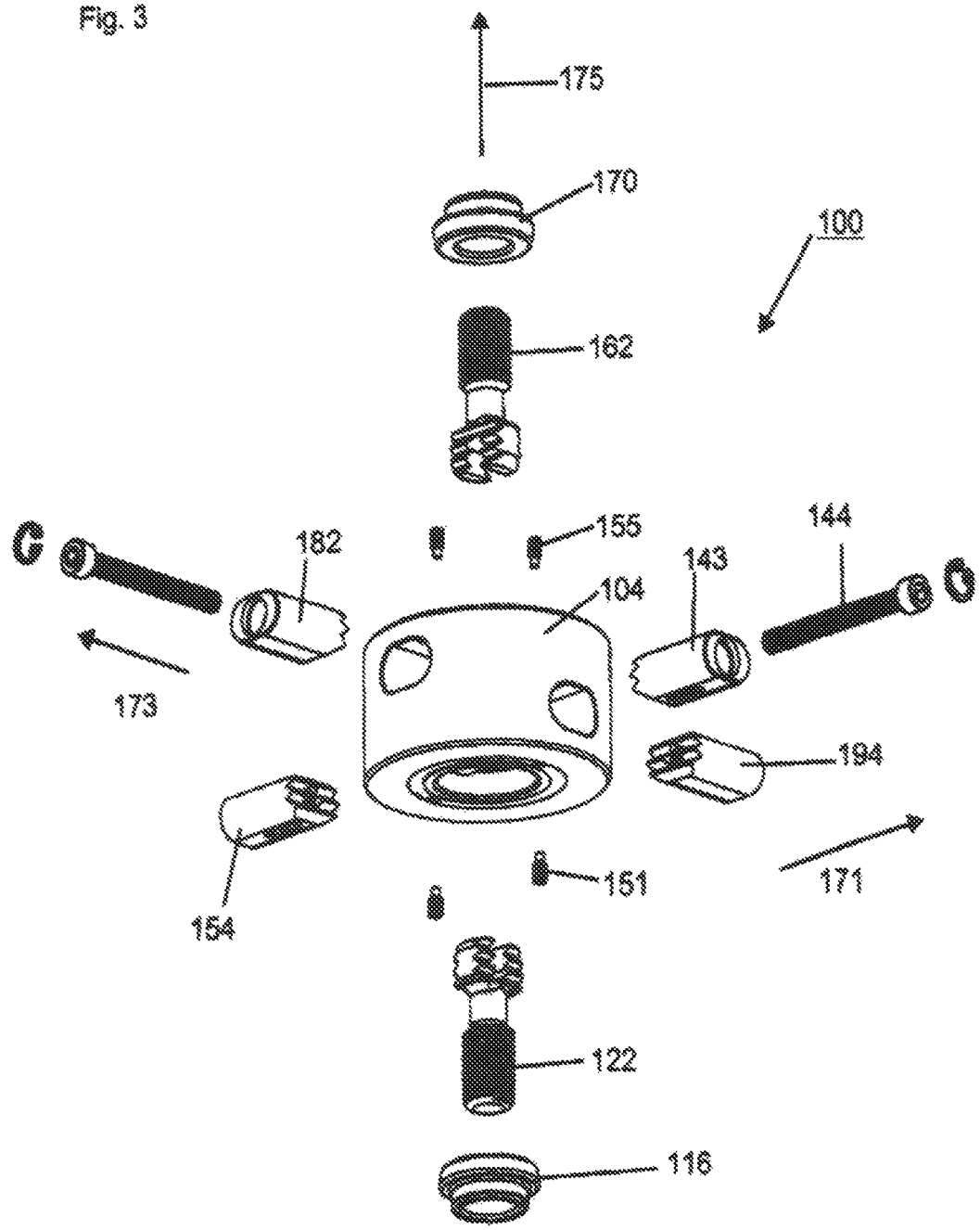
FIG. 3 is a perspective exploded assembly view of a work piece mounting system shown generally 100.
Figure 4:
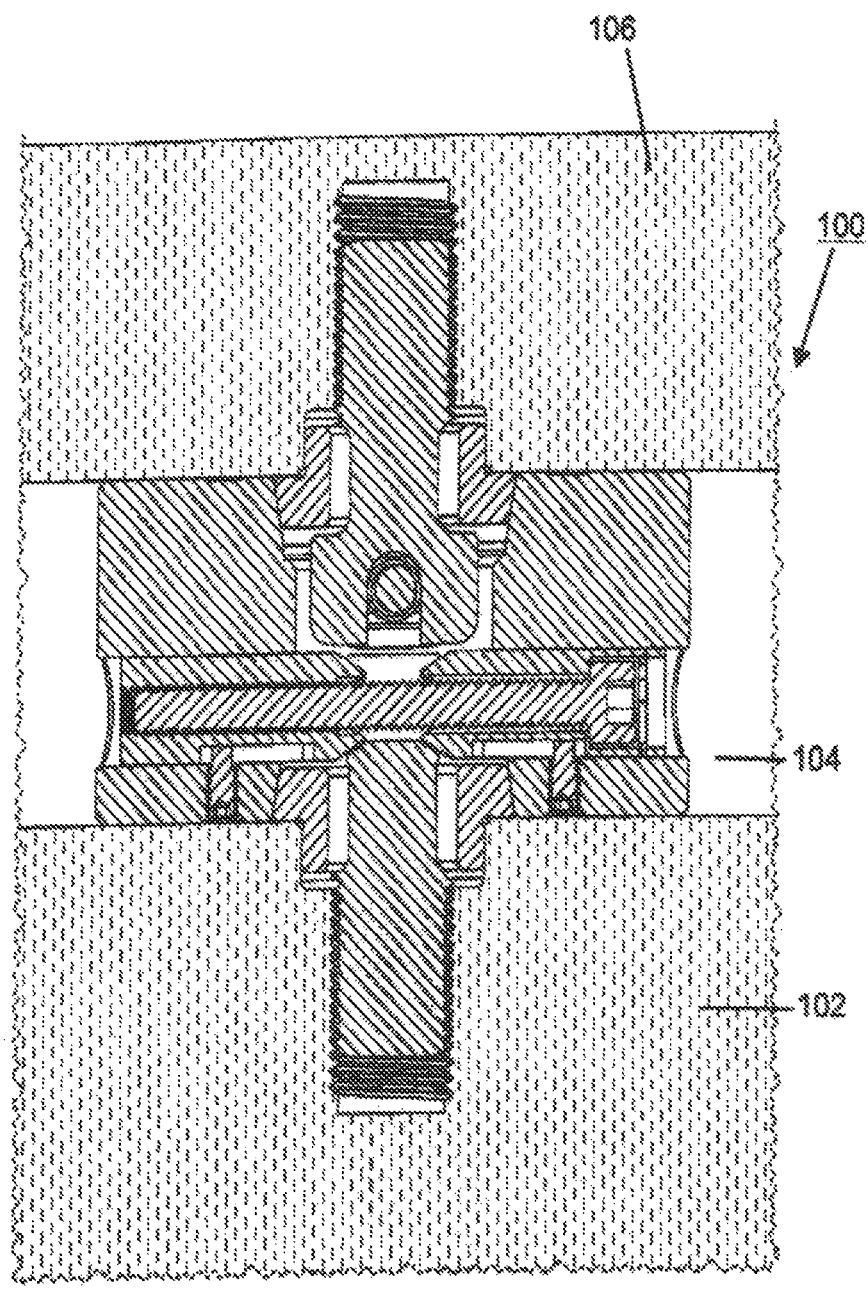
FIG. 4 is a cross sectional view of a work piece mounting system shown generally 100 deployed with a portion of a plate 102 also referred to as a work table and a portion of a work piece 106 the cross section taken through the center of first lower jaw passageway.
Figure 5:
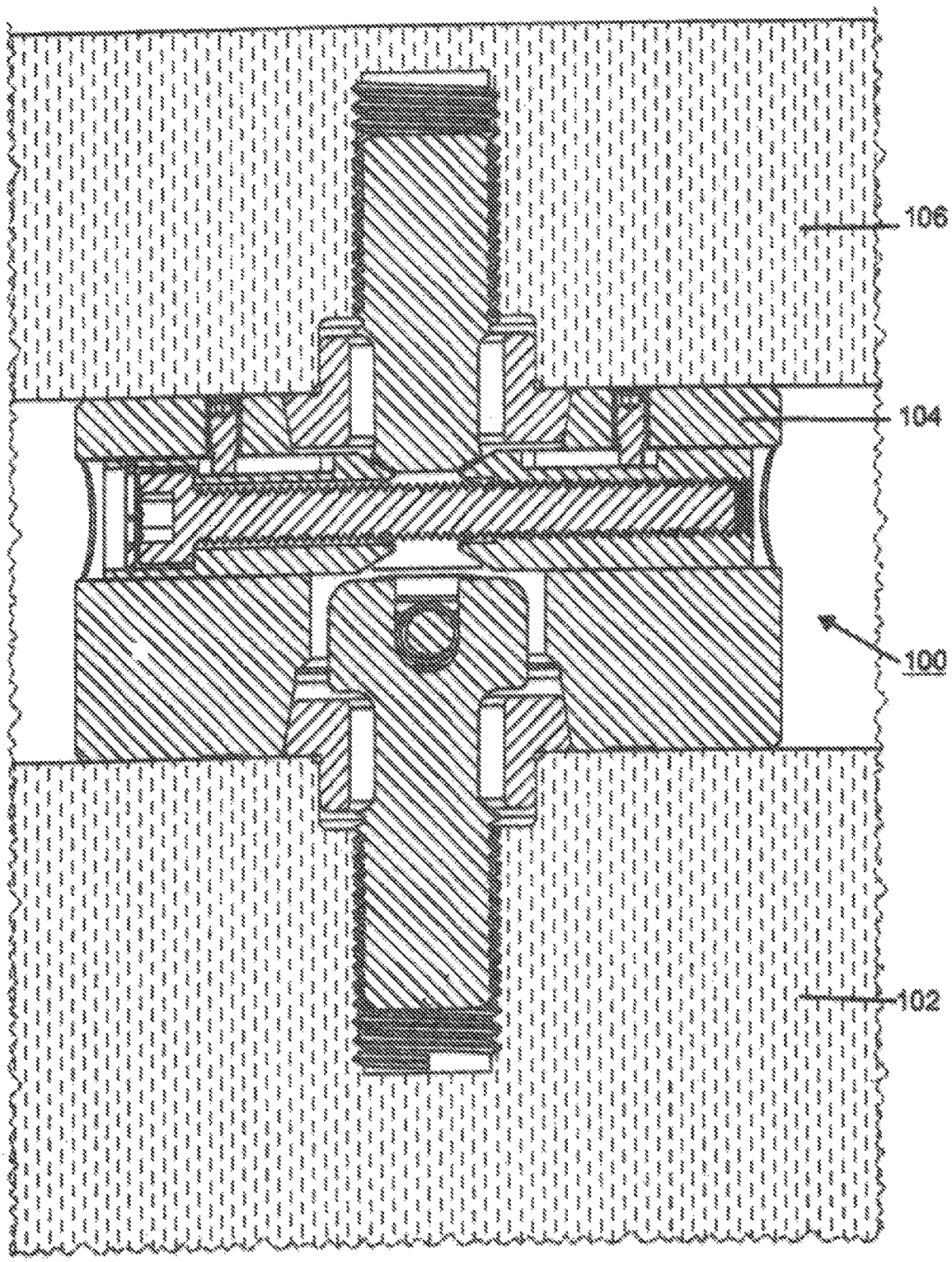
FIG. 5 is a cross sectional view of a work piece mounting system shown generally 100 deployed with a portion of a plate 102 also referred to as a work cable and a portion of a work piece 106 the cross section taken through the center of second upper jaw passageway.

In FIG. 3 the spacial co-ordinates are identified with the horizontal plane in the depictions lying along an x-y plane. The x axis is denoted 171, the y axis 173 and the z axis 175. It is understood the system could be oriented in any configuration and orientation however for clarity the examples show the device with the vertical cavity 130 lying along the z axis.

Figure 2:
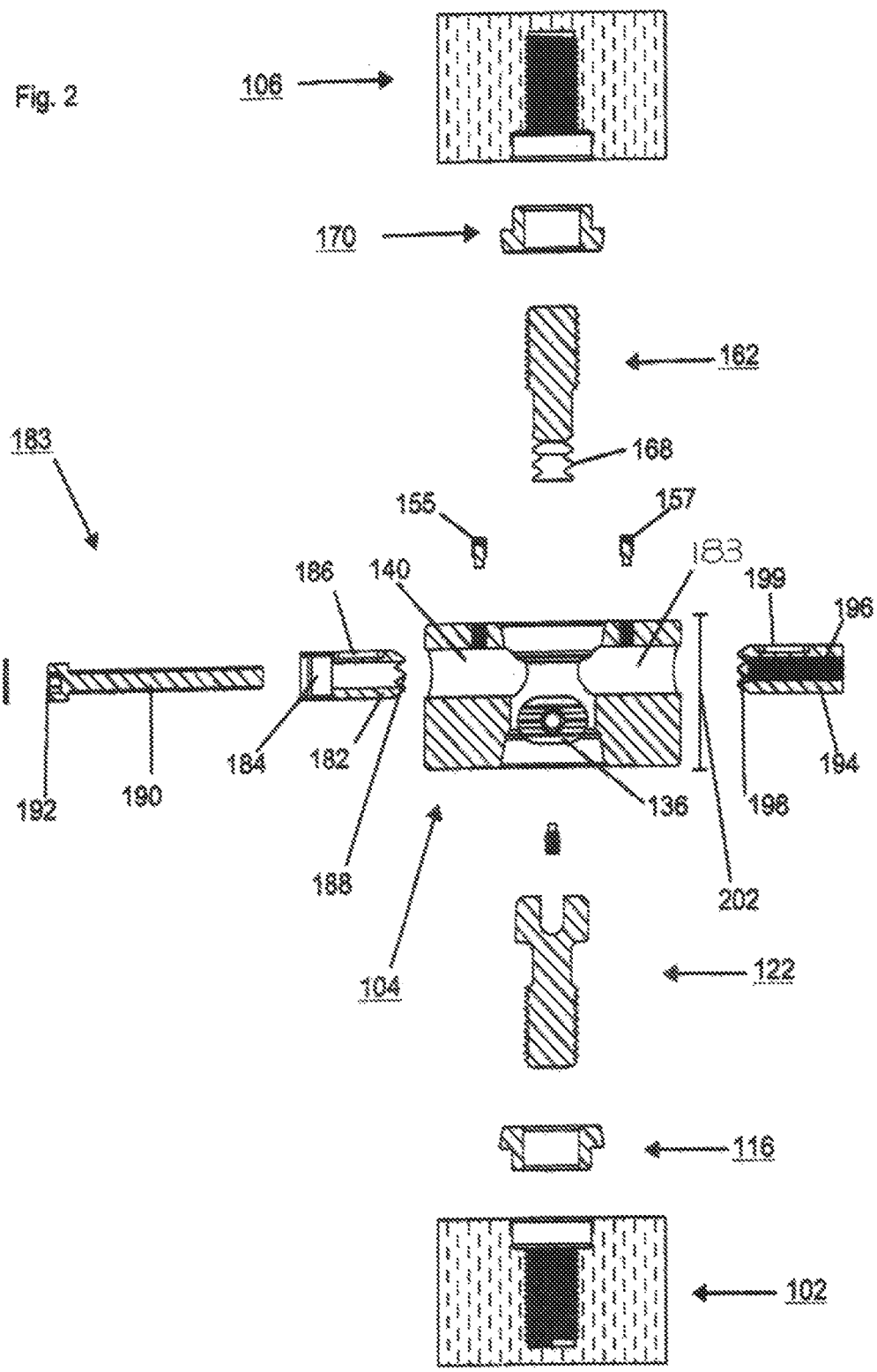
FIG. 2 is identical to FIG. 1 in other words.

Main body 104 further includes radial passageways namely, coextensive first and second lower jaw passageways 136 and 138 shown in FIG. 1, together referred to as an horizontal lower jaw passageway, as well as coextensive first and second upper jaw passageways 140 and 142, together referred to as an horizontal upper jaw passageway in FIG. 2. These passageways have an oblong cross section which ensures that the jaws can easily be oriented in the correct position allowing the grooved ends 128 and 168 to properly engage with the grooved portions 150, 158, 188 and 198 of the jaws. The passageways and jaws have a biconvex, oblong cross sectional shape with a flat portion extending along the top and bottom portions as seen in FIG. 1 denoted 140 and FIG. 2 denoted 136 which prevents rotation of the jaw within the passageway and provides for automatic rotational indexing of the jaw.

The passageways 136, 138, 140 and 142 and the cooperating jaws 143, 154, 182 and 194 are depicted with a biconvex, oblong, cross sectional shape with a flat portion extending along the top and bottom portions which prevents rotation of the jaw within the passageway. The cross sectional shape of the passageways and jaws may be square, rectangular, ob-round, elliptical, parabolic or other shapes which prevents rotation of the jaws within the passageway.

Vertical cavity 130 is oriented approximately normal to the coextensive upper and lower jaw passageways 140, 142, 136 and, 338.

Looking now to FIG. 1 and in particular to the first lower jaw assembly 142, this includes a lower screw 144, a screw cap 146, a first lower jaw 143 which includes a cap recess 152, a screw channel 148, a grooved portion 150, and a set recess 154.

Second lower jaw 154 includes a grooved portion 158, a threaded hole 156 for receiving lower threaded portion of lower screw 144 therein and a set recess 160. To further fixate first and second lower jaws 143 and 154 lower set screw 151 and lower set screw 153 are used to penetrate set recesses 155 and 160.

Radially oriented coextensive first and second upper jaw passageways 140 and 142 namely horizontal upper jaw passageway viewed from the top of main body 104 extends perpendicular to horizontal lower jaw passageway namely coextensive first and second lower passageways 136 and 138 and are nested in such a fashion that the thickness T 202 of main body 104 is minimized.

Additionally by orienting the passageways in this manner the tightening forces are distributed more evenly throughout the main body 104 minimizing unbalanced stresses in the system and improving the rigity and dimensional stability. In FIG. 3 for example the upper jaw passageway lies along a y axis and the lower jaw passageway lies along the x axis. The angular relationship between the upper jaw passageway and the lower jaw passageway in x-y relationship is selected to be able to nest the passageways to reduce a thickness T 202 of the main body. The smallest thickness T 202 of the main body 104 is obtained when the angular relationship between the upper jaw passageway and the lower jaw passageway in x-y relationship is selected to be able to nest the passageways so that they are oriented 90 degrees or perpendicular to each other as shown in FIGS. 1, 2 and 3 when viewed from above in the z direction which minimizes the thickness T 202 of the main body.

Referring now to FIG. 2 for example, first upper jaw assembly 183 includes upper screw 190, screw cap 192, first upper jaw 182, which includes cap recess 184, set recess 186, and groove portion 188. Second upper jaw 194 includes threaded hole 196 for receiving the threaded portion of upper screw 190 therein set recess 199, grooved portion 198.

The reader will note that the grooved end 128 of lower fixation element 122 cooperatively engages with the groove portions 150 and groove portion 158 of the first and second lower jaws 143 and 154 as shown in FIG. 1.

Referring now back to FIGS. 1 and 2 upper fixation element 162 includes upper threaded end 164 which is received within upper blind threaded hole 180, shank portion 166 and grooved end 168. Upper set screws 155 which are shown in FIG. 1 and upper set screw 157 which is shown in FIG. 2 is used to further fixate first upper jaw 182 and second upper jaw 194.

Upper centering collar 170 includes shoulder 172 and bushing portion 174 which is received within bushing receiver 178 of upper seat 176. Below upper seat 176 is a upper blind threaded hole 180 within work piece 106 which will be fixated in place using the work piece mounting system 100 as depicted.

The reader will note that all of the radial passageways namely, the four jaw passageways namely first lower jaw passageway 136, second lower jaw passageway 138, first upper jaw passageway 140 and second upper jaw passageway 142 are not circular in cross section but rather are oval and or oblong in shape as shown head-on in FIG. 1 as first upper jaw passageway 140 and it is shown head on as first lower passageway 136 in FIG. 2.

In Use

The reader will note that first and second lower jaws 143 and 154 are brought together with lower screw 144 by threading into threaded hole 156 thereby urging and clamping first and second lower jaws 143 and 154 onto the grooved end 128 of lower fixation element 122 thereby ensuring that a tight fit is accomplished.

Similarly now looking at first and second upper jaw passageways, in FIG. 2, as upper screw 190 is tightened into threaded hole 196 of second upper jaw 194 the two upper jaws namely first upper jaw 182 and second upper jaw 194 are urged into closer proximity and therefore tighten down on to upper grooved end 168 of upper fixation element 162 thereby creating a tight fit.

Lower fixation elements 122 and upper fixation elements 162 are threadably received into lower blind threaded hole 114 and upper blind threaded hole 180 respectively. As lower screw 144 and upper screw 190 are tightened and the grooved portions 150 and grooved ends 128 as well as groove portion 158 and on the upper side grooved portions 198 and 188 are forcibly urged together they apply a pulling force in the case of the upper fixation element 162 such that the shoulder 172 is drawn into the upper shoulder recess 132 of main body 104.

On the lower side, lower fixation element 122 is urged upwardly such that the shoulder 118 of lower centering collar 116 is urged into the lower shoulder recess 134 of main body 104 thereby further tightening the entire work piece mounting system 100.

Correct orientation of the jaws 143, 154, 194 and 382 is intuitive since the jaws and jaw passageways are oblong and fit together in the correct orientation provided the set recess is facing downwardly.

Set screws 151, 153, 155 and 157 are used to further fix upper and lower jaws 182, 194, 143, and 154.

I claim:

1. A work piece mounting system, for connecting two work elements together, the work piece mounting system which includes:

a) a main body with horizontally radially oriented horizontal upper and lower jaw passageways for receiving therein upper and lower jaws respectively;

b) the radially oriented horizontal upper and lower jaw passageways, are adapted to receive the jaws slid-ably therein, c) a vertical cavity extending vertically and centrally through the main body, along a z-axis, and is configured for receiving a grooved end of a lower fixation element upwardly therein and a grooved end of an upper fixation element downwardly therein, wherein the other threaded end of the fixation elements are configured for detachably rigidly connecting to a working element;

d) wherein the jaws include a grooved portion for engaging with a grooved end of the fixation elements which are configured such that the fixation elements are drawn into the main body upon engagement of the grooved portions with the grooved ends thereby tensioning the fixation elements between the main body and the work elements;

e) wherein the angular relationship between the upper jaw passageway and the lower jaw passageway in a horizontal plane x-y relationship is selected to be able to nest the passageways to minimize a thickness T of the main body for improved rigity and dimensional stability of the work piece mounting system.

2. The work piece mounting system claimed in claim 1 wherein the angular relationship between the upper jaw passageway and the lower jaw passageway in x-y relationship is selected to be able to nest the passageways so that they are oriented 90 degrees or perpendicular to each other when viewed from above along the z direction, this orientation minimizes a thickness T of the main body for improved rigidity and dimensional Stability of the work piece mounting system.

3. The work piece mounting system claimed in claim 1 wherein the passageways and jaws are configured to prevent rotation of the jaws within the passageways.

4. The work piece mounting system claimed in claim 3 wherein the cross sectional shape of the jaws and passageways is configured such that the jaws are restricted from rotating within the passageways.

5. The work piece mounting system claimed in claim 1 wherein the cross sectional shape of the jaws and passageway comprise a biconvex, oblong cross sectional shape with a flat portion extending along the top and bottom portions which prevents rotation of the jaw within the passageway and provides for automatic rotational indexing of the jaw.

6. The work piece mounting system claimed in claim 5 wherein the jaws further include a set recess for receiving a set screw therein to further fixate the jaws and prevent sliding of the jaws within the passageway.

7. The work piece mounting system claimed in claim 1 wherein one of the work elements is a work piece.

8. The work piece mounting system claimed in claim 1 wherein one of the work elements is a plate.

9. A work piece mounting system which includes;

a) a plate with at least one lower seat;

b) a work piece with at least one upper seat;

c) positioned there between a main body with an upper and lower detachable fixation element the upper fixation element adapted to detachably connect the main body to the work piece and plate respectively, and the lower fixation element adapted to detachably connect the main body to the work plate;

d) jaws, received within upper and lower passageways, each jaw including a grooved portion configured to clamp against a grooved end of the fixation element, wherein the fixation elements are drawn into the main body upon clamping thereby tensioning the upper fixation elements between the main body and workpiece and tensioning the lower fixation element between the main body and plate;

e) wherein the upper and lower passageways are oriented orthogonal to each other in x-y relationship and are nested in such a fashion that the thickness T of the main body is minimized.

f) further wherein the passageways and jaws are configured to prevent rotation of the jaws.

* * * * *